Oct. 17, 1950  G. M. DEMING  2,525,875
APPARATUS FOR THERMOCHEMICALLY CUTTING METAL
Filed Oct. 6, 1945
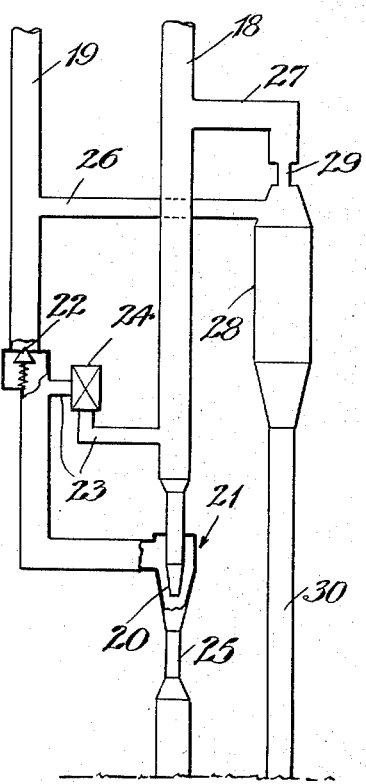
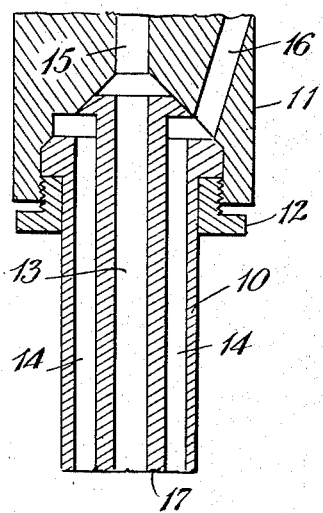
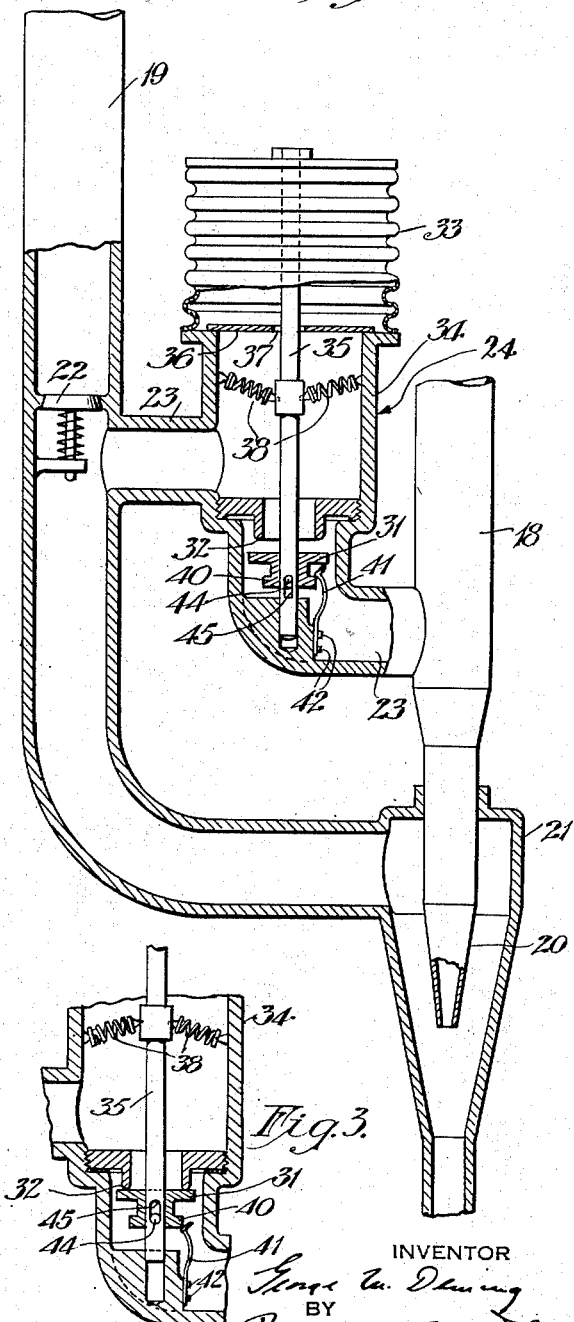
INVENTOR
George M. Deming
BY
Pennie, Davis, Marvin & Edmonds
ATTORNEYS Patented Oct. 17, 1950

2,525,875

UNITED STATES PATENT OFFICE 2,525,875

APPARATUS FOR THERMOCHEMICALLY CUTTING METAL

George M. Deming, Orange, N. J., assignor to Air Reduction Company, Incorporated, a corporation of New York Application October 6, 1945, Serial No. 620,698

8 Claims. (Cl. 158—27.4)

This invention relates to apparatus for thermo-chemically cutting metal.

It has been proposed that in cutting metal by means of an oxygen cutting torch the jet of cutting-oxygen be projected into the kerf alternately with a flame jet large enough to reach substantially to the bottom of the kerf. This procedure makes it possible to cut through heavier sections than usual because sufficient heat is supplied to the lower portion of the kerf to insure continuance of the thermo-chemical action; the large flame jet blows out the molten slag and oxide so that when the cutting jet is again projected into the kerf it will attack fresh metal; and dilution of the oxygen stream in the lower portion of the kerf by products of combustion from the heating flame such as would normally interfere with continuance of the thermo-chemical action is avoided.

The principal object of this invention is to provide improved apparatus by means of which metal may be cut by the procedure above described.

According to the invention cutting-oxygen is delivered to the usual central passage in the torch tip alternately with a combustible mixture of oxygen and fuel gas to feed the large flame jet. The alternating supply of oxygen and combustible gas mixture is obtained by passing the oxygen through an injector which, during the intervals when the combustible mixture is to be supplied to the cutting-oxygen passage in the tip, draws in from a fuel-gas supply conduit the proper quantity of fuel-gas for mixing with the oxygen. During these intervals a valve in a by-pass between the oxygen supply conduit and the fuel-gas supply conduit, and which is alternately opened and closed as hereinafter described, remains in its closed position. When this valve is open some of the oxygen, by reason of its higher pressure, flows through the by-pass and through the valve into the fuel-gas supply conduit, closes a check valve therein to shut off the supply of fuel-gas, and proceeds to the injector through that portion of the fuel-gas supply conduit which is downstream from the check valve. Thus, under these circumstances, oxygen alone is delivered to the cutting-oxygen passage in the torch tip. The invention also contemplates a special form of gas-operated valve, which in combination with the injector, operates automatically to alternately open and close the by-pass and thereby cause the alternate delivery of cutting-oxygen and combustible gas mixture to the cutting-oxygen passage in the torch tip.

In the accompanying drawing:

Figure 1 is a diagrammatic representation of apparatus embodying the invention;

Fig. 2 is a side elevation, partly in vertical section, of a gas-operated valve which may be used in combination with the injector to effect automatic opening and closing of the by-pass; and Fig. 3 is a vertical section of a portion of the gas-operated valve of Fig. 2 showing the valve element in closed position.

Referring first to Fig. 1, a conventional tip of a cutting torch is represented at 10. A portion of the torch head in which the tip is clamped is shown at 11. The tip is clamped in the head in the usual manner by means of a tip nut 12. The tip has the usual central passage 13 and a number of surrounding preheat passages 14. In conventional practice, cutting-oxygen is delivered to the central passage 13 of the tip by a passage 15 in the torch head and a combustible mixture of oxygen and acetylene or other fuel-gas is delivered to the preheat passages 14 by a passage 16 in the torch head. In accordance with the invention a combustible mixture of oxygen and fuel-gas, produced as hereinafter described, is delivered to the preheat passages 14 as heretofore to feed the usual system of relatively short preheating flame jets at the discharge face 17 of the tip, but the central passage is utilized to conduct to the discharge face of the tip an alternate supply of cutting-oxygen and combustible gas mixture as above stated.

An oxygen supply conduit is represented in Fig. 1 at 18 and a supply conduit for fuel-gas, such as acetylene, is represented at 19. The conduits 18 and 19 supply the oxygen and acetylene at suitable pressures, say 150 p. s. i. and 12 p. s. i., respectively. The oxygen supply conduit communicates with the oxygen passage 15 in the torch head. At some point before the oxygen reaches the torch tip it passes through the nozzle 20 of an injector 21. After the acetylene passes a check valve 22 in the acetylene supply conduit 19 it is delivered to the chamber of the injector as shown. A by-pass 23 connects the oxygen supply conduit 18 at a point in advance of the injector, i. e. at the upstream side of the injector, with the acetylene supply conduit 19 at a point close to the downstream side of the check valve 22. This by-pass is controlled by a rotary or reciprocating valve represented at 24. When the valve is closed, acetylene is drawn into the injector chamber by the oxygen passing through the nozzle of the injector and mixes with the oxygen in the mixing tube 25 to produce a combustible mixture which is delivered to the cutting-oxygen passage 13 in the torch tip. When the valve 24 is open, some of the oxygen, which is at much higher pressure than the acetylene, flows through the by-pass, closes the check valve 22 in the acetylene supply conduit, and flows into the injector chamber through the portion of the conduit 19 that formerly supplied the acetylene. Under these conditions only oxygen is delivered to the cutting-oxygen passage 13 in the torch tip.

The combustible oxyacetylene mixture for delivery to the preheat passages 14 in the torch tip to produce the usual preheating flames is formed by tapping acetylene from the supply conduit 19, at a point at the upstream side of the check valve 22, by means of a branch conduit 26, and tapping oxygen from the supply conduit 18 at a point at the upstream side of the injector by means of a branch conduit 27, and delivering the tapped oxygen and acetylene to a mixing chamber 28. The oxygen passes through a metering passage, such as an orifice represented at 29, on its way from the supply conduit 18 to the mixing chamber. A conduit 30 leading from the mixing chamber delivers the gas mixture to the passage 16 in the torch head which, as above stated, communicates with all of the preheat passages 14 in the torch tip.

It will now be seen that if the valve 24 be alternately opened and closed at a predetermined frequency, cutting-oxygen will be delivered to the central passage 13 of the torch tip alternately with a mixture of oxygen and acetylene. The oxyacetylene mixture will be ignited by the hot kerf to produce a relatively large flame jet which will reach substantially to the bottom of the kerf. The oxyacetylene mixture delivered constantly to the preheat passages 14 in the tip and containing the metered quantity of oxygen will produce the usual system of relatively small preheating flame jets.

The valve 24 may be actuated to alternately open and close it in any desired way. Preferably, however, the valve is operated by the gas which flows through it and by the action of the injector so that it is self-operating and automatically opens and closes at the desired frequency. A valve of the reciprocating type which operates in this manner is shown in Fig. 2. The valve element 31 cooperates with a lip 32 to control the flow of oxygen from the oxygen supply conduit 18 through the by-pass 23 to the acetylene supply conduit 19. The valve has a bellows 33 one end of which is fixed to the valve casing 34 and the other end of which is connected to the valve stem 35. A plate 36 closes the fixed end of the bellows and is provided with an opening 37 through which the valve stem 35 passes. The opening 37 provides sufficient clearance around the valve stem to act as a metering orifice. When the valve element 31 is open, oxygen at high pressure leaks into the bellows through the clearance 37 around the valve stem until the pressure in the bellows is sufficient to close the valve element. Oxygen is then drawn out of the bellows through the clearance 37 by the suction created by the injector, and the reduction in pressure causes the bellows to collapse and open the valve. The cycle is repeated and the valve element continues to automatically open and close alternately and thereby cause alternate delivery of oxygen and an oxyacetylene mixture to the tip passage 13 as above described. Preferably, the valve stem 35 is connected to the valve casing 34 by a spring toggle arrangement shown at 38 to cause the valve element to open and close with a snap action.

The valve element 31 has a flange 40 in position to contact with a button at the end of a leaf spring 41 secured to a fixed portion of the valve casing by fastenings, such as screws 42. The valve element 31 is free to slide on the valve stem 35 and is connected to the valve stem by a pin 44 which extends through the valve element and through a slot 45 in the valve stem.

When the valve element 31 is in open position, as shown in Fig. 2, the button at the end of the spring 41 contacts with the upper edge of the flange 40 and holds the flange against upward displacement until the valve stem 35 has moved up far enough to shift the springs 38 beyond dead center. The further upward movement of the valve stem 35 is made with a snap action under the influence of the springs 38, and the lower end of the slot 45 pulls the pin 44 upward with the valve stem 35 and causes the valve element 31 to close quickly.

Fig. 3 shows the valve element 31 in closed position. The button on the end of the leaf spring 41 then contacts with the lower edge of the flange 40 and holds the valve element 31 closed. The valve stem 35 can move downward without moving the valve element 31 into open position for a distance that depends upon the length of the slot 45. The slot is long enough so that the valve stem 35 can move downward beyond the dead center position of the springs 38 before the end of the upper slot 45 contacts with the pin 44 and moves the valve element into open position.

The conduits and other parts shown in Figure 1 ahead of the torch head 11 may be located in the torch casing or in any other suitable part of the torch itself.

I claim:

1. Apparatus for thermo-chemically cutting metal comprising a torch having a tip provided with a cutting-oxygen passage, an oxygen supply conduit in communication with said tip passage, an injector through which the oxygen passes on its way to the tip passage, a fuel-gas supply conduit for supplying fuel-gas at less pressure than the oxygen and communicating with the injector, a check valve in the fuel-gas conduit, a by-pass between the two supply conduits at the upstream side of the injector and communicating with the fuel-gas conduit at the downstream side of said check valve, and a valve controlling said by-pass adapted to be alternately opened and closed whereby when the valve is closed oxygen passing through the injector draws in fuel-gas which is mixed with the oxygen and delivered to said tip passage to produce a large flame jet and when the valve is open some oxygen flows through the by-pass and closes the check valve in the fuel-gas conduit and passes to the injector so that oxygen alone is then delivered to said tip passage.

2. Apparatus for thermo-chemically cutting metal comprising a torch having a tip provided with a cutting-oxygen passage, an oxygen supply conduit in communication with said tip passage, an injector having a nozzle through which the oxygen passes on its way to the tip passage, a fuel-gas supply conduit for supplying fuel-gas at less pressure than the oxygen and communicating with the injector chamber, a check valve in the fuel-gas conduit, a by-pass between the two supply conduits at the upstream side of the injector and communicating with the fuel-gas conduit at the downstream side of said check valve, and a valve controlling said by-pass adapted to be alternately opened and closed for the purpose described.

3. Apparatus for thermo-chemically cutting metal comprising a torch having a tip provided with a cutting-oxygen passage and a plurality of surrounding preheat passages, an oxygen supply conduit in communication with said cutting-oxygen passage in the tip, an injector through which the oxygen passes on its way to said cutting-oxygen passage, a fuel-gas supply conduit for supplying fuel-gas at less pressure than the oxygen and communicating with the injector, a check valve in the fuel-gas supply conduit, a by-pass between the two supply conduits at the upstream side of the injector and communicating with the fuel-gas supply conduit at the downstream side of said check valve, a valve controlling said by-pass adapted to be alternately opened and closed whereby when the valve is closed a mixture of oxygen and fuel-gas is delivered to the cutting-oxygen passage in the tip to produce a relatively large flame jet and when the valve is open oxygen alone is delivered to said cutting-oxygen passage, means for delivering a mixture of oxygen and fuel-gas to said preheat passages in the tip to produce relatively small preheating flame jets, said means comprising a mixing chamber, a branch conduit communicating with the fuel-gas supply conduit at the upstream side of said check valve for delivering fuel-gas to the mixing chamber, a branch conduit communicating with the oxygen supply conduit at the upstream side of said injector for delivering oxygen to the mixing chamber, a metering passage through which the oxygen passes on its way from the oxygen supply conduit to the mixing chamber, and a supply conduit leading from said mixing chamber and communicating with all of the preheat passages in the torch tip.

4. Apparatus for thermo-chemically cutting metal comprising a torch having a tip provided with a cutting-oxygen passage, an oxygen supply conduit in communication with said tip passage, an injector through which the oxygen passes on its way to the tip passage, a fuel-gas supply conduit for supplying fuel-gas at less pressure than the oxygen and communicating with the injector, a check valve in the fuel gas conduit, a by-pass between the two supply conduits at the upstream side of the injector and communicating with the fuel-gas conduit at the downstream side of said check valve, a valve element controlling said by-pass and closing in the direction of gas flow therethrough, means for automatically opening and closing the valve element comprising an expansible and contractible fluid chamber at the downstream side of the valve element and having a movable portion connected to the valve element, and means providing an oxygen passage serving when the valve element is open to admit a metered quantity of oxygen from the by-pass into said fluid chamber to increase the pressure therein and expand the same and close the valve element, said injector then functioning to withdraw oxygen from said fluid chamber through said oxygen passage to collapse the fluid chamber and open the valve element.

5. Apparatus for producing an alternate delivery of one gas and a mixture of such gas with a second gas which is at less pressure than the first gas, comprising supply conduits for the two gases, an injector through which the first gas passes on its way to the delivery point, a check valve in the supply conduit for the second gas, a by-pass between the two supply conduits at the upstream side of the injector and communicating with the conduit for the second gas at the downstream side of said check valve, a valve element controlling said by-pass and closing in the direction of gas flow therethrough, means for automatically opening and closing the valve element comprising an expansible and contractible fluid chamber at the downstream side of the valve element and having a movable portion connected to the valve element, and means providing a gas passage serving when the valve element is open to admit a metered quantity of the first gas from the by-pass into said fluid chamber to increase the pressure therein and expand the same and close the valve element, said injector then functioning to withdraw gas from said fluid chamber through said gas passage to collapse the fluid chamber and open the valve element.

6. Apparatus for thermo-chemically cutting metal comprising a torch having a tip provided with a cutting-oxygen passage, separate oxygen and fuel-gas supply lines, a common conduit with which said supply lines communicate and which is in communication with said tip passage, and automatic valve means operated by the gas flow of one supply line for alternately shutting off and turning on the gas flow from the fuel-gas supply line.

7. Apparatus for thermo-chemically cutting metal comprising a torch having a tip provided with a cutting-oxygen passage, separate oxygen and fuel-gas supply lines, a common conduit with which said supply lines communicate and which is in communication with said tip passage, a valve for shutting off the fuel-gas supply line from communication with said common conduit, and automatic apparatus operated by gas of one of said supply lines for alternately opening and closing said valve.

8. Apparatus for thermochemically cutting metal comprising a torch having a tip provided with a cutting oxygen passage, separate oxygen and fuel-gas supply lines, a common conduit in communication with said supply lines and the tip passage and through which oxygen and a mixture of fuel-gas and oxygen are alternately supplied to the tip passage, and automatic valve means operated by the flow of gas to said common conduit for causing the shift from oxygen flow in the common conduit to the flow of fuel-gas and oxygen mixture therein and vice versa.

GEORGE M. DEMING.

REFERENCES CITED

The following references are of record in the file of this patent:

UNITED STATES PATENTS

| Number | Name | Date |
| --- | --- | --- |
| 1,704,374 | Stewart et al. | Mar. 5, 1929 |
| 1,723,959 | Thomson | Aug. 6, 1929 |
| 1,921,698 | Price | Aug. 8, 1933 |
| 2,067,622 | Smith | Jan. 12, 1937 |